(12) United States Patent
Yamagishi et al.

(10) Patent No.: US 10,311,663 B2
(45) Date of Patent: Jun. 4, 2019

(54) VEHICLE DOOR CONTROL DEVICE

(71) Applicant: MITSUBISHI JIDOSHA KOGYO KABUSHIKI KAISHA, Tokyo (JP)

(72) Inventors: Takashi Yamagishi, Tokyo (JP); Naoki Kawashima, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/911,722

(22) Filed: Mar. 5, 2018

(65) Prior Publication Data
US 2018/0253921 A1  Sep. 6, 2018

(30) Foreign Application Priority Data

Mar. 3, 2017 (JP) ................................ 2017-040021

(51) Int. Cl.
| | |
|---|---|
| *G07C 9/00* | (2006.01) |
| *E05B 81/56* | (2014.01) |
| *E05B 83/36* | (2014.01) |
| *E05B 81/16* | (2014.01) |
| *B60R 25/24* | (2013.01) |
| *E05B 81/20* | (2014.01) |
| *E05B 81/76* | (2014.01) |
| *E05B 83/40* | (2014.01) |

(Continued)

(52) U.S. Cl.
CPC ........ *G07C 9/00682* (2013.01); *B60R 25/246* (2013.01); *E05B 81/16* (2013.01); *E05B 81/20* (2013.01); *E05B 81/56* (2013.01); *E05B 81/76* (2013.01); *E05B 83/36* (2013.01); *E05B 83/40* (2013.01); *E05F 15/632* (2015.01); *E05F 15/77* (2015.01); *G07C 9/0069* (2013.01); *G07C 9/00182* (2013.01); *E05Y 2900/531* (2013.01); *E05Y 2900/546* (2013.01); *G07C 2009/00222* (2013.01)

(58) Field of Classification Search
CPC ........................... G07C 9/00682; E05F 15/632
USPC .................................................. 340/5.5–5.55
See application file for complete search history.

(56) References Cited

U.S. PATENT DOCUMENTS

| 7,696,859 B2 * | 4/2010 | Teshima | ................ B60R 25/245 307/10.2 |
| 9,424,698 B2 * | 8/2016 | Yasui | ................. G07C 9/00007 |
| 10,070,451 B2 * | 9/2018 | Yonehara | ............... H04W 48/18 |

(Continued)

FOREIGN PATENT DOCUMENTS

| DE | 10 2006 007 958 A1 | 8/2007 |
| DE | 10 2008 014 515 A1 | 10/2008 |

(Continued)

OTHER PUBLICATIONS

Extended European Search Report dated Jul. 31, 2018 in corresponding EP Application No. 18159757.6.

*Primary Examiner* — Allen T Cao
(74) *Attorney, Agent, or Firm* — Birch, Stewart, Kolasch & Birch, LLP (57) ABSTRACT

A vehicle door control device controls opening/closing of door members provided in entrances of a vehicle. The vehicle door control device includes a selective instruction portion that is provided on a vehicle exterior side of each of the door members and that is configured to selectively issue a closing instruction to close the door members and a closing and locking instruction to close and lock the door members.

9 Claims, 8 Drawing Sheets

(51) Int. Cl.
  *E05F 15/632* (2015.01)
  *E05F 15/77* (2015.01)

(56) References Cited

U.S. PATENT DOCUMENTS

| | | | |
|---|---|---|---|
| 2002/0050721 A1* | 5/2002 | Kobayashi | E05B 85/01 |
| | | | 292/216 |
| 2007/0115096 A1 | 5/2007 | Suzuki et al. | |
| 2009/0224879 A1* | 9/2009 | Nakazawa | G07C 9/00309 |
| | | | 340/5.72 |
| 2015/0176309 A1* | 6/2015 | Lange | E05B 85/08 |
| | | | 292/194 |
| 2015/0300074 A1 | 10/2015 | Ette et al. | |
| 2017/0117832 A1* | 4/2017 | Ikeda | H02P 3/14 |

FOREIGN PATENT DOCUMENTS

| | | | | |
|---|---|---|---|---|
| DE | 10 2012 025 366 A1 | 7/2014 | | |
| EP | 2 154 035 A1 | 2/2010 | | |
| EP | 3 061 658 A1 | 8/2016 | | |
| JP | 2005-54494 A | 3/2005 | | |
| JP | 2005299098 A | * 10/2005 | | B60R 25/2036 |
| JP | 2008-88720 A | 4/2008 | | |

\* cited by examiner

VEHICLE DOOR CONTROL DEVICE

CROSS REFERENCE TO RELATED APPLICATION

This application is based on Japanese Patent Application No. 2017-040021 filed on Mar. 3, 2017, the contents of which are incorporated herein by reference.

BACKGROUND

1. Technical Field

The present invention relates to a vehicle door control device which controls opening/closing of door members provided in entrances of a vehicle.

2. Background Art

In the background art, a power slide door system (opening/closing assisting function) for assisting opening/closing of door members provided in entrances of a vehicle has been used widely.

For example, JP-A-2005-54494 describes an invention as to a vehicle door opening/closing assisting device provided with a smart key system. The vehicle door opening/closing assisting device transmits a call signal from an on-vehicle antenna to the surroundings. On receiving a response signal from a smart key responding to the call signal, the vehicle door opening/closing assisting device performs authentication and enters a door unlocking standby state. After that, on detecting a force applied to a door knob of a door, the vehicle door opening/closing assisting device unlocks the door and releases a latch. Then the vehicle door opening/closing assisting device provides a force corresponding to the force applied to the door knob in order to assist opening/closing of the door. When no force is applied to the door knob, the assisting force is not provided. When the force applied to the door knob becomes zero before the door is fully opened, providing the assisting force is ceased at that point of time.

In a vehicle control device according to JP-A-2008-88720, when a user performs a predetermined operation, doors of a vehicle which have been opened are fully closed, and the fully closed doors are locked. In the vehicle control device, when it is determined that no portable machine capable of issuing at least an instruction to open/close the doors is present within a predetermined range from the vehicle until the doors are perfectly closed after the predetermined operation is detected, the user is informed of the fact that the portable machine is not present within the predetermined range from the vehicle.

According to the aforementioned background-art techniques, closing door members and locking the door members have to be performed by different operations respectively. However, closing the door members and locking the door members are often performed concurrently in many scenes, for example, when all of passengers get out of a vehicle and leave the vehicle. Therefore, there is room for improvement in terms of operability. JP-A-2008-88720 suggests that an instruction to close door members and lock the door members can be issued by one operation on the portable machine. However, all the passengers of the vehicle do not carry portable machines respectively. Therefore, persons who can operate portable machines are limited. In addition, for a person who carries a baggage or the like, it is sometimes troublesome to operate a portable machine.

The present invention has been developed in consideration of such circumstances. An object of the invention is to provide a vehicle door control device capable of performing an operation of closing door members of a vehicle and an operation of locking the door members concurrently and easily.

SUMMARY OF INVENTION

A vehicle door control device according to an aspect of the invention is a vehicle door control device for controlling opening/closing door members provided in entrances of a vehicle, the vehicle door control device including a selective instruction portion which is provided on a vehicle exterior side of each of the door members and which can selectively issue a closing instruction to close the door members and a closing and locking instruction to close and lock the door members.

Due to the provision of the selective instruction portion which can selectively issue a closing instruction to close a door member and a closing and locking instruction to close and lock the door member, the operation can be terminated in a shorter time than in a case where locking is accepted after all the door members are closed. In addition, since the number of operations is only one, the operability of the vehicle door can be improved advantageously. In addition, since the selective instruction portion is provided on the vehicle exterior side of each of the door members, a user who carries a portable machine can issue the closing and locking instruction even when the hands of the user are full of baggage or the like. Thus, user friendliness can be improved.

DETAILED DESCRIPTION OF PREFERRED EMBODIMENTS

A preferred embodiment of a vehicle door control device according to the invention will be described below in detail with reference to the accompanying drawings.

Figure 1A:
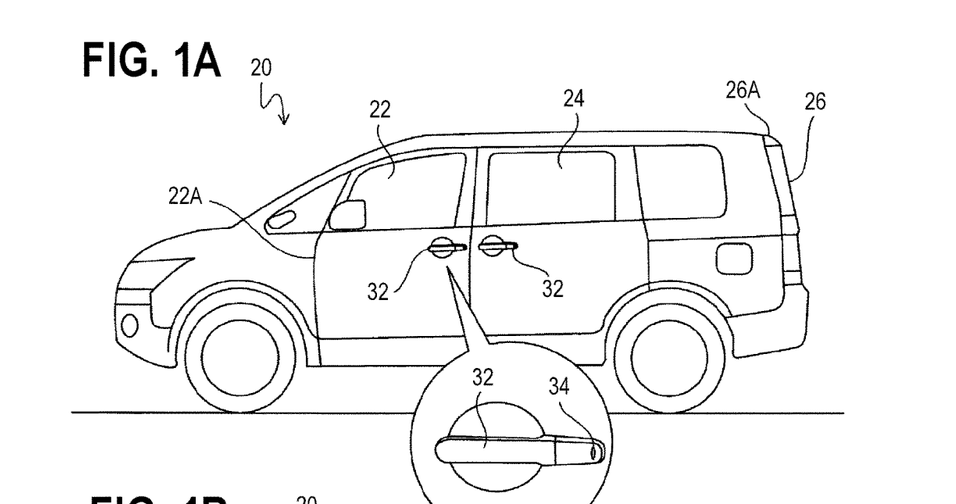
FIGS. 1A to 1C are outline views of a vehicle 20 mounted with a vehicle door control device 10 according to an embodiment.
Figure 1B:
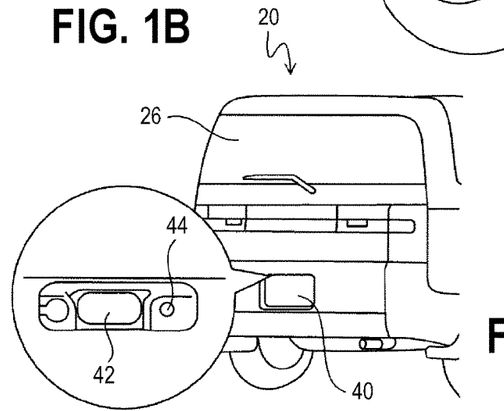
Figure 1C:
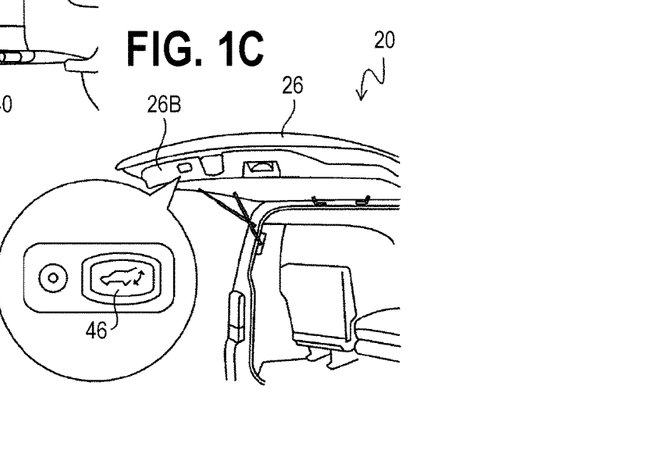

FIG. 1 are outline views of a vehicle 20 mounted with a vehicle door control device 10 according to the embodiment. FIG. 1A is a side view, and FIGS. 1B and 1C are rear perspective views.

The vehicle 20 is provided with front seat door members 22, rear seat door members 24, and a tail gate door member 26. Each front seat door member 22 is used for boarding a front seat (such as a driver's seat or an assistant driver's seat). Each rear seat door member 24 is used for boarding a second seat or a third seat. The tail gate door member 26 is used for using a luggage space in a vehicle rear portion.

Each front seat door member 22 is a hinged door in which a vehicle front side 22A is attached to a vehicle body through hinges so that the front seat door member 22 can swing around the hinges in a vehicle width direction to be thereby opened and closed. Each rear seat door member 24 is a sliding door which can move in a vehicle longitudinal direction to be thereby opened and closed. The tail gate door member 26 is a hinged door in which a vehicle upper side 26A is attached to the vehicle body through hinges so that the tail gate door member 26 can swing around the hinges in a vehicle height direction to be thereby opened and closed.

Of those door members, each of the rear seat door members 24 and the tail gate door member 26 has an opening/closing assisting mechanism 70 (see FIG. 3) for generating an assisting force to assist opening/closing of the door member. The opening/closing assisting mechanism 70 is mounted with an opening/closing assisting function (so-called power sliding door system (for the rear seat door member 24) or electric tail gate system (for the tail gate door member 26)).

In addition, the vehicle 20 is provided with operation portions 30 for opening/closing the door members and locking the door members respectively.

Figures 5A, 5B:
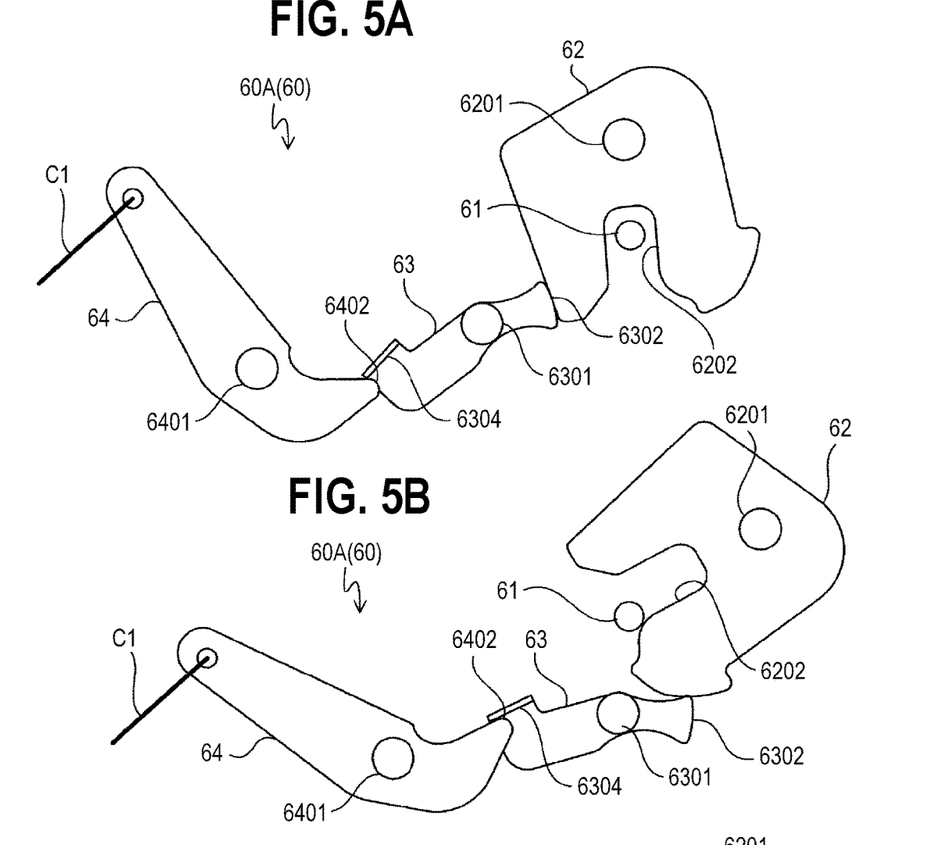
FIGS. 5A to 5C are explanatory views of a latch portion.
Figure 5C:
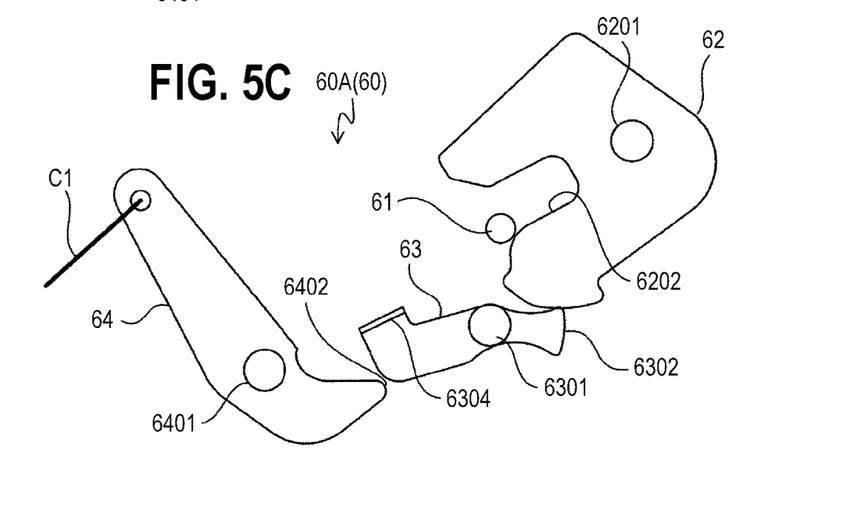

Each of the front seat door members 22 and the rear seat door members 24 is provided with a door handle 32 and a door switch 34 for opening/closing the door member. In order to open the front seat door member 22 from the outside of the vehicle, a user pulls the door handle 32 toward himself/herself (to make the door handle 32 leave the vehicle body) to thereby release a latch mechanism 60A (see FIG. 5) from engagement so that the door member can swing outward in the vehicle width direction. In order to close the front seat door seat 22 from the outside of the vehicle, the user makes the door member swing inward in the vehicle width direction so as to move the door member to a closed position where the latch member 60A can be engaged therewith.

In order to open/close the rear seat door member 24 from the outside of the vehicle, the user pulls the door handle 32 toward himself/herself up to a predetermined position or pushes down the door switch 34 once, to thereby actuate the power sliding door system. Thus, the door member is opened/closed automatically. In such a case that the power sliding door system is off, the user can grasp the door handle and move the door member in the vehicle longitudinal direction to thereby open/close the door member.

When the user who has a keyless operation key 50 which will be described later pushes down the door switch 34 of the front seat door member 22 in a state where all the door members have been closed, the door members can be locked. When the user pushes down the door switch 34 of the front seat door member 22 or the rear seat door member 24 in a state where the door members has been locked, the door members can be unlocked.

In the tail gate door member 26, an open switch 42 and a lock switch 44 are provided around a number plate 40. In order to open the tail gate door member 26 from the outside of the vehicle, the user pushes down the open switch 42 once to thereby actuate the electric tail gate system. Thus, the door member can be opened automatically. In such a case that the electric tail gate system is off, the door member can be opened when the user pulls up the door member in the vehicle height direction after pushing down the open switch 42.

When the user who carries a keyless operation key 50 which will be described later pushes down the lock switch 44 in a state where all the door members have been closed, the door members can be locked. When the user pushes down the lock switch 44 in a state where the door members have been locked, the door members can be unlocked.

Further, as shown in FIG. 1C, a close switch 46 is provided in a lower end portion 26B which will be exposed when the tail gate door member 26 is opened. In order to close the tail gate door member 26, the electric tail gate system can be actuated to automatically close the door member when the close switch 46 is pushed down once.

Figure 2:
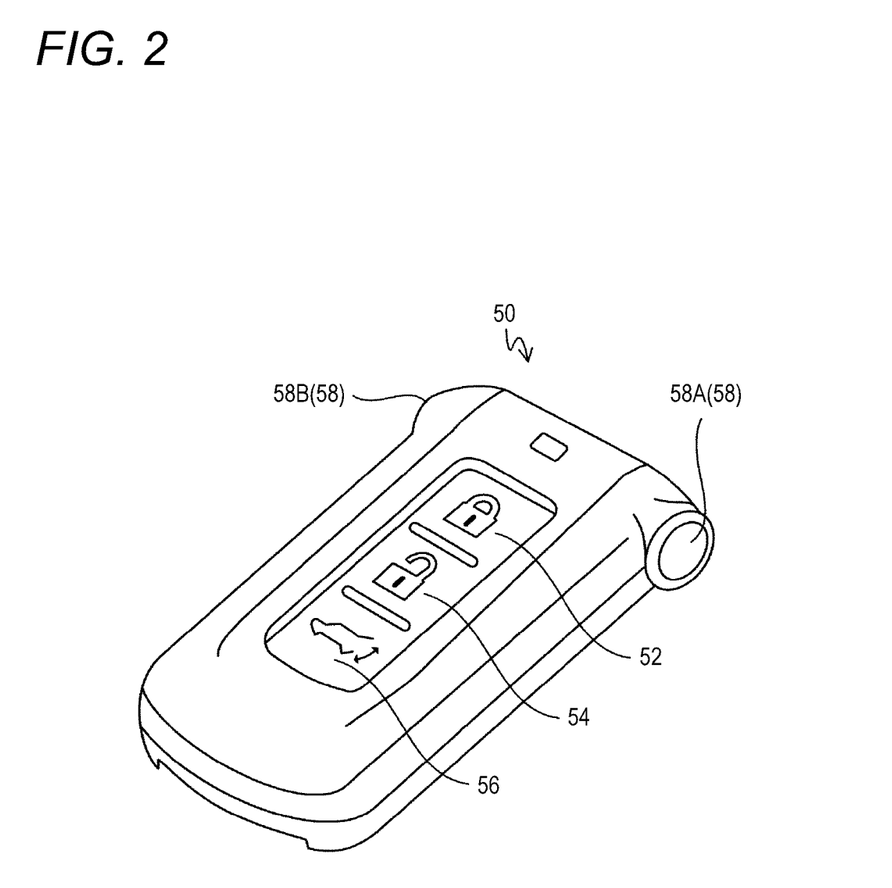
FIG. 2 is an explanatory view showing the outline of a keyless operation key 50.

In addition, the keyless operation key 50 shown in FIG. 2 is provided as an operation portion 30 for opening/closing and locking the door members.

The keyless operation key 50 is provided with a lock switch 52, an unlock switch 54, a tailgate switch 56, electric sliding door switches 58 (58A (for the right door) and 58B (for the left door). When each switch is operated within a predetermined distance from the vehicle 20, a door member corresponding to the switch can be opened/closed or locked.

That is, when the lock switch 52 is pushed down in a state where all the door members have been closed, the door members are locked. When the unlock switch 54 is pushed down in a state where the door members have been locked, the door members are unlocked.

In addition, when the tail gate switch 56 is, for example, pushed down twice within two seconds in a state where the tail gate door member 26 has been closed, the tail gate door member 26 is opened by the electric tail gate system. When the tail gate switch 56 is pushed down in a state where the tail gate door member 26 has been opened, the tail gate door member 26 is closed by the electric tail gate system.

In addition, when the electric sliding door switch 58A or 58B is pushed down in a state where the rear seat door member 24 corresponding to the switch pushed down has been closed, the rear seat door member 24 is opened by the power sliding door system. When the electric sliding door switch 58A or 58B is pushed down in a state where the rear seat door member 24 corresponding to the switch pushed down has been opened, the rear seat door member 24 is closed by the power sliding door system.

In addition, operation portions 30 for opening/closing and locking the respective door members are also provided on the vehicle interior sides of the door members and around the driver's seat. Those operation portions 30 are not associated with the processing of the vehicle door control device 10. Therefore, description of the operation portions 30 will be omitted.

Practically, when a door member is opened/closed using the power sliding door system or the electric tail gate system (opening/closing assisting function), it is, for example, determined whether the opening/closing assisting function is effective or not, whether the vehicle is stopping or not, whether there is or not an obstacle between the door member and the vehicle body, and so on.

Figure 3:
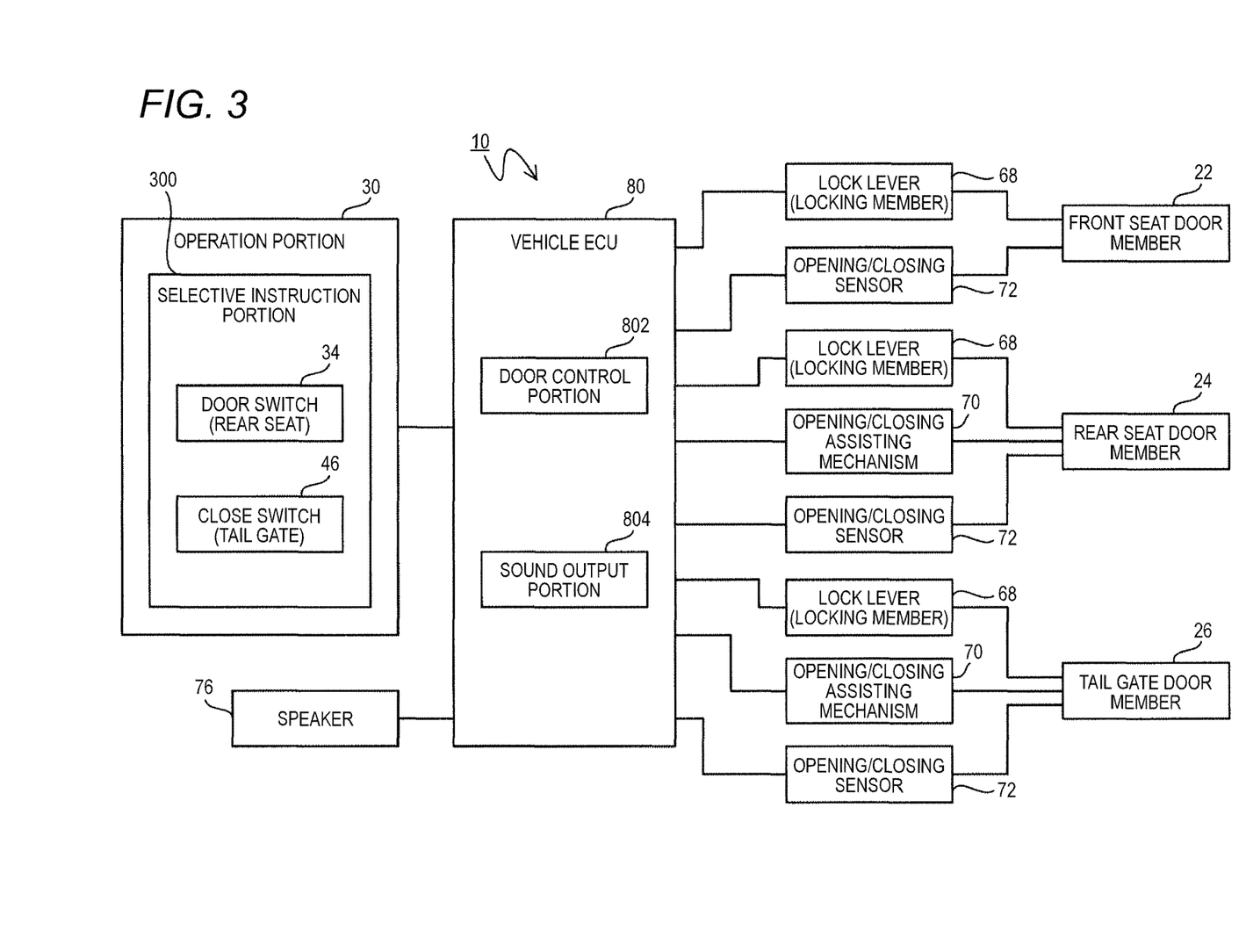
FIG. 3 is a block diagram showing a configuration of the vehicle door control device 10.

FIG. 3 is a block diagram showing the configuration of the vehicle door control device 10.

The vehicle door control device 10 controls opening/closing of the door members (the front seat door members 22, the rear seat door members 24 and the tail gate door member 26) provided in entrances of the vehicle 20.

As described above, of the door members of the vehicle 20, each of the rear seat door members 24 and the tail gate door member 26 has the opening/closing assisting mechanism 70 which can generate an assisting force for assisting the opening/closing of the door member. The opening/closing assisting mechanism 70 is provided with a wire, an actuator and so on. The actuator takes up or reels out the wire which is attached to a door body. The opening/closing assisting mechanism 70 opens/closes the rear seat door member 24 or the tail gate door member 26 in accordance with an operation on the door handle 32, the door switch 34, the keyless operation key 50, etc.

In addition, each door member 22, 24, 26 is provided with an opening/closing sensor 72, and a lock lever 68 which is a locking member. The opening/closing sensor 72 detects the opening/closing state of the door member 22, 24, 26 (for example, whether the door member 22, 24, 26 is in a fully closed state or in another (opened) state).

A vehicle ECU 80 has a configuration including a CPU, a ROM for receiving and storing a control program and so on, a RAM serving as a working area for the control program, a storage portion such as an EEPROM for rewritably holding various data, an interface portion for taking an interface with peripheral circuits and so on, etc.

Due to the CPU executing the control program, the vehicle ECU 80 serves as a door control portion 802 and a sound output portion 804.

The door control portion 802 executes opening/closing and locking of the respective door members in accordance with operations on the control portions 30. On receiving an instruction to open or close a door member having an opening/closing assisting mechanism 70, the door control portion 802 actuates the opening/closing assisting mechanism 70 to thereby open or close the door member. On receiving an instruction to lock or unlock a door member, the door control portion 802 uses a not-shown actuator to move the lock lever 68 to a lock position or an unlock position. The lock lever 68 will be described later in detail.

The sound output portion 804 uses a speaker 76 to output a sound corresponding to processing (such as accepting an operation input from one of the control portions 30 or opening/closing or locking each door member) of the door control portion 802. In this embodiment, the sound output portion 804 uses the speaker 76 to mainly output a beep such as "peep" or "pippip".

The operation portions 30 are provided for performing operations for issuing instructions to open/close and lock the door members. As described above, the operation portions 30 include the door handles 32 and the door switches 34 provided in the front seat door members 22 and the rear seat door members 24 respectively, the open switch 42, the lock switch 44 and the close switch 46 provided in the tail gate door member 26, the keyless operation key 50, etc.

Here, some of the operation portions 30 serve as selective instruction portions 300. Each selective instruction portion 300 can selectively issue a closing instruction to close door members and a closing and locking instruction to close and lock door members. The closing instruction is an instruction to move door members, which have been opened, to fully closed positions. The closing and locking instruction is an instruction to move door members, which have been opened, to the fully closed positions and to lock all the door members of the vehicle 20.

In this embodiment, assume that the selective instruction portions 300 include the door switches 34 of the rear seat door members 24 which can be closed by the power slide door system, and the close switch 46 of the tail gate door member 26 which can be closed by the electric tail gate system. That is, the selective instruction portions 300 are provided on the vehicle exterior sides of the door members each having the opening/closing assisting mechanism 70.

Each of the door switches 34 of the rear seat door members 24 and the close switch 46 of the tail gate door member 26 serving as the selective instruction portions 300 is a single switch. Therefore, the closing instruction and the closing and locking instruction can be selectively issued in accordance with a difference in operation method on the switch.

For example, the operation method on the switch depends on the number of times with which the switch is pushed down. When the switch is pushed down once, an instruction is accepted on the assumption that the closing instruction has been selected. When the switch is pushed down twice, an instruction is accepted on the assumption that the closing and locking instruction has been selected. The closing instruction indicates one-step processing of closing, and the closing and locking instruction indicates two-step processing of closing and locking. The number of steps is associated with the number of times with which the switch is operated, so that the user can intuitively recognize the contents of an instruction corresponding to the operation.

When the closing instruction is issued, the door control portion 802 actuates the opening/closing assisting mechanism 70 to move door members, which have been opened, to fully closed positions.

When the closing and locking instruction is issued, the door control portion 802 first moves the lock levers 68, which are locking members, to lock positions (locking positions), and then actuates the opening/closing assisting mechanism 70 to move door members, which have been opened, to fully closed positions. When locking is performed before closing the door members in this manner, the other door members that have been fully closed can be locked quickly. Thus, the user friendliness can be improved. For example, when the closing of the door members is stopped for some reason, the locking members for the other door members are moved back to unlock positions so as to be unlocked.

The sound output portion 804 outputs different acceptance sound for a case where the closing instruction is selected in the selective instruction portion 300 and a case where the closing and locking instruction is selected therein. Specifically, for example, when the closing instruction is selected, an acceptance sound of "peep" is outputted because the contents of indicated processing include only one action (only closing). On the other hand, when the closing and locking instruction is selected, an acceptance sound of "pippip" is outputted because the contents of indicated processing include two actions (closing and locking).

In addition, the sound output portion 804 outputs different operation sounds for a case where closing is being performed when the closing instruction is selected and a case where closing and locking are being performed when the closing and locking instruction is selected. Specifically, for example, when the closing instruction is selected, an operation sound of "peep peep" is outputted because the contents of indicated processing include only one action (only closing). On the other hand, when the closing and locking instruction is selected, an operation sound of "pippippippip" is outputted because the contents of indicated processing include two actions (closing and locking). That is, an operation sound is outputted in accordance with the number of action items.

As a result, the user can confirm whether the operation performed by the user himself/herself is or not an operation intended by the user himself/herself. Particularly, since the locking action is performed inside each door member the user cannot see, the user cannot find any difference between the motion of the vehicle after the closing instruction and the motion of the vehicle after the closing and locking instruction. Therefore, when the sound corresponding to the indicated contents is outputted during the closing action, a sense of security can be given to the user.

Here, the detailed configuration of a door lock portion serving as an opening/closing and locking mechanism of a door member will be described.

Figure 7A:
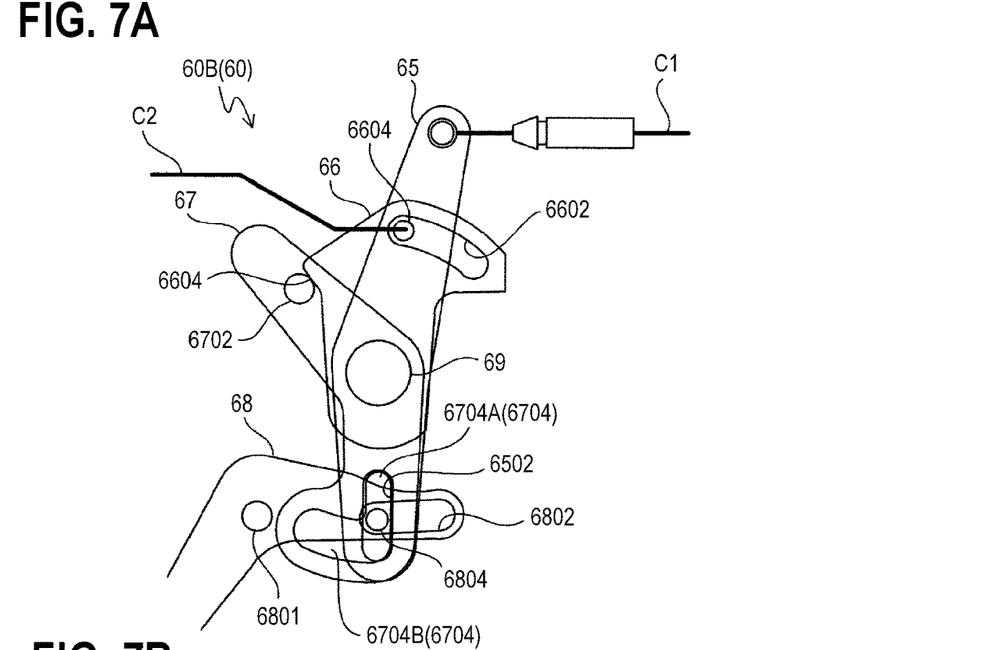
FIGS. 7A and 7B are explanatory views in which an open lever does not swing even when a handle lever and a control lever swing in a state where a lock lever is positioned in a lock position.
Figure 7B:
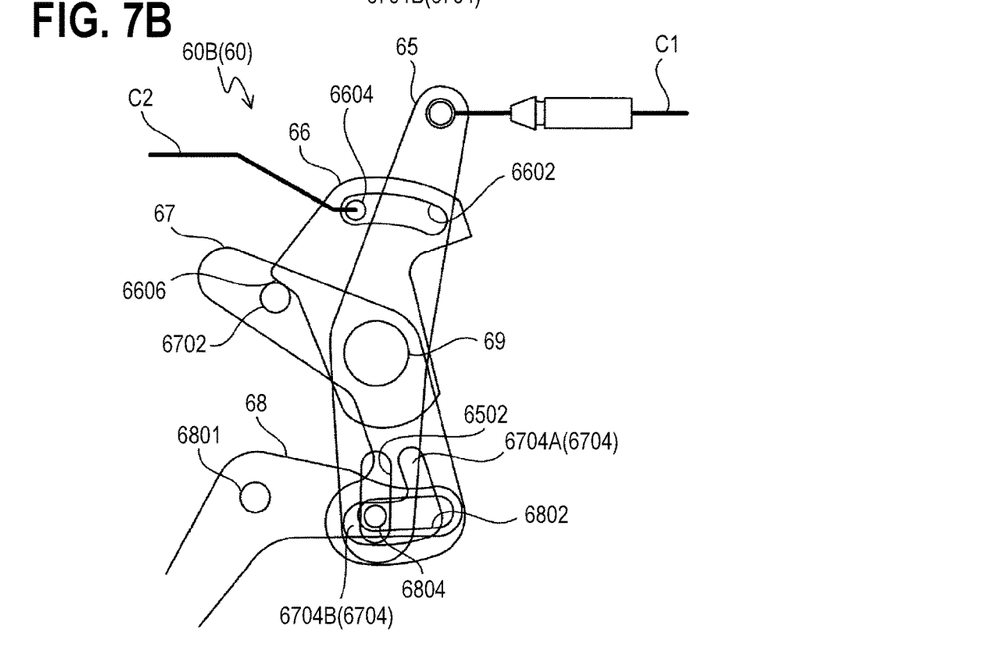

As shown in FIG. 5 and FIG. 7, a door lock portion 60 has a configuration including a latch mechanism 60A and a link mechanism 60B.

As shown in FIG. 5A, the latch mechanism 60A has a configuration including a striker 61, a fork 62, a pawl lever 63, and an open lever 64. The latch mechanism 60A serves as a retention mechanism for retaining the door member in a fully closed position with respect to the vehicle body.

The striker 61 is provided on the vehicle body side. The fork 62, the pawl lever 63 and the open lever 64 are on the door member side.

An engagement groove 6202 which can be engaged with the striker 61 is provided in the fork 62.

The fork 62 can swing between a locked position shown in FIG. 5A and an opened position shown in FIG. 5B with a spindle 6201 as a fulcrum. The fork 62 is urged to the opened position by a not-shown spring.

The pawl lever 63 can swing between a regulated position shown in FIG. 5A and a deregulated position shown in FIG. 5B with a spindle 6301 as a fulcrum. The pawl lever 63 is urged to the regulated position by a not-shown spring.

When the pawl lever 63 is in the regulated position, the engagement portion 6302 is engaged with the fork 62 to retain the locked position of the fork 62.

As shown in FIGS. 5A and 5B, when the engagement portion 6302 of the pawl lever 63 in the regulated position is moved by the open lever 64, the pawl lever 63 swings from the regulated position to the deregulated position so as to allow the fork 62 to swing from the locked position to the opened position.

The open lever 64 can swing between a standby position shown in FIG. 5A and an operation position shown in FIG. 5B with a spindle 6401 as a fulcrum. The open lever 64 is urged to the standby position by a not-shown spring.

When the open lever 64 is in the standby position, one end 6402 of the open lever 64 is engaged with an engagement portion 6304 of the pawl lever 63. When the open lever 64 is in the operation position, the open lever 64 makes the pawl lever 63 swing to the deregulated position.

The link mechanism 60B is provided in the door member.

As shown in FIGS. 6A to 6D, the link mechanism 60B has a configuration including an open lever 65, a handle lever 66, a control lever 67, and a lock lever 68. The open lever 65, the handle lever 66 and the control lever 67 can swing with a common spindle 69 as a fulcrum. The lock lever 68 can swing with a spindle 6801 as a fulcrum.

Figure 6A:
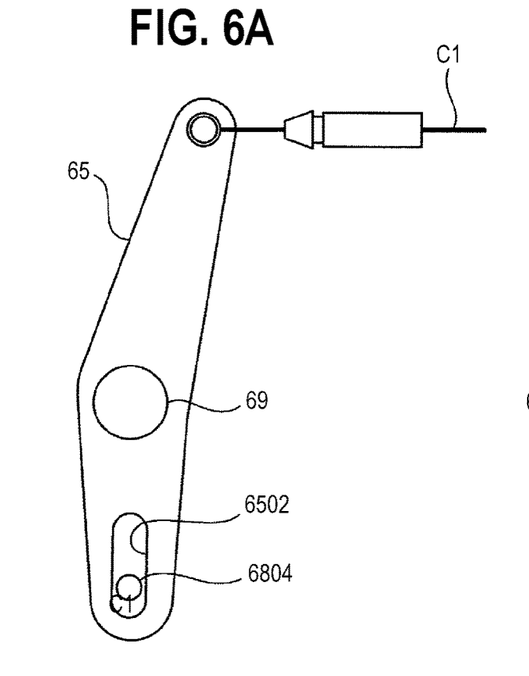
FIGS. 6A to 6D are explanatory views of levers constituting a link mechanism.

As shown in FIG. 6A, one end of the open lever 65 is connected to the open lever 64 of the latch mechanism 60A through a cable C1.

Figure 6B:
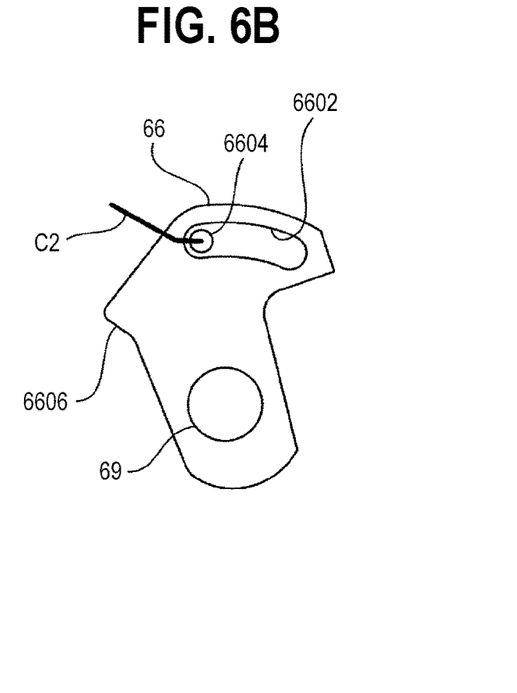

As shown in FIG. 6B, an engagement pin 6604 connected to the door handle 32 through a cable C2 is engaged with an engagement groove 6602 of the handle lever 66, and the cable C2 is connected to a not-shown door handle actuator.

Figure 6C:
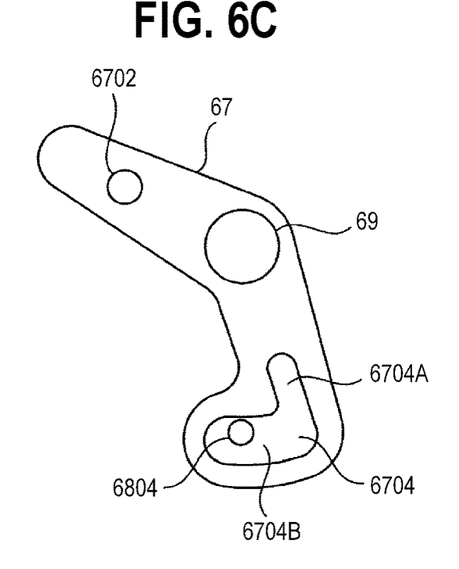

As shown in FIG. 6C, an engagement pin 6702 which can be engaged with an engagement portion 6606 of the handle lever 66 is provided in the control lever 67.

In addition, the control lever 67 is also provided with an engagement groove 6704 including an unlock area 6704A and a lock area 6704B.

Figure 6D:
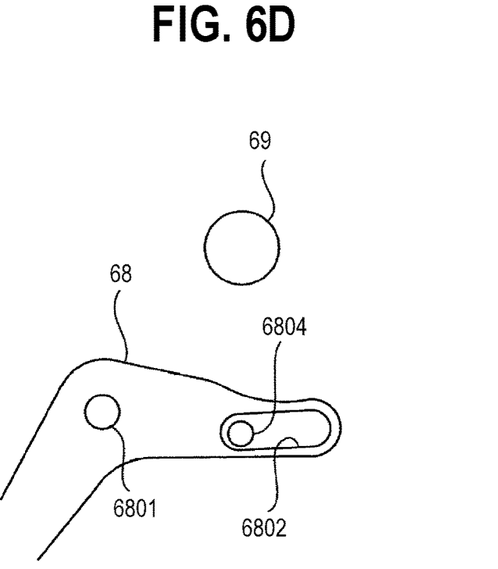

As shown in FIGS. 6A, 6C and 6D, the engagement pin 6804 is in engagement over the engagement groove 6502 of the open lever 65, the engagement groove 6704 of the control lever 67, and the engagement groove 6802 of the lock lever 68.

Figure 8A:
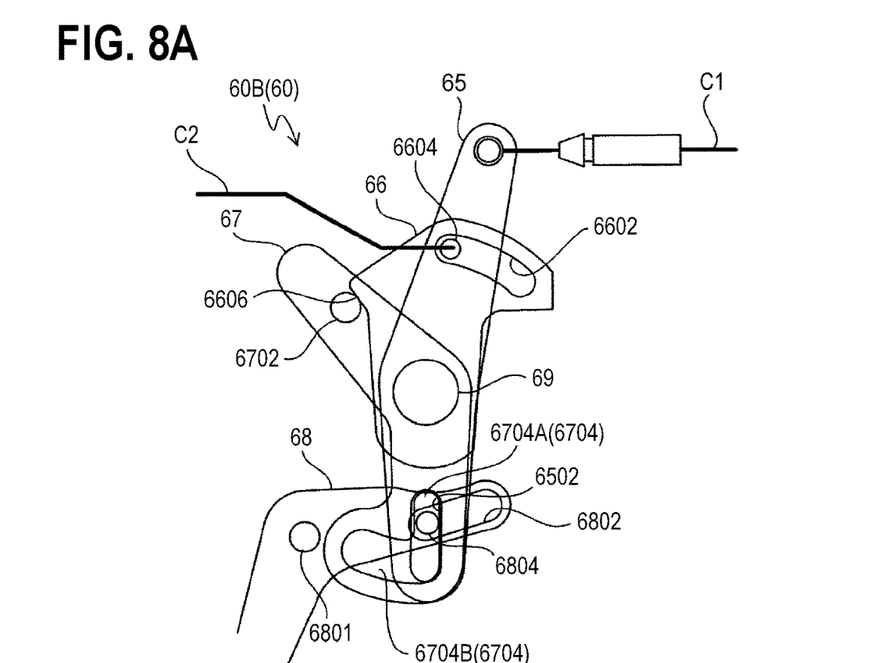
FIGS. 8A and 8B are explanatory views in which the open lever swings when the handle lever and the control lever swing in a state where the lock lever is positioned in an unlock position.

The lock lever 68 can swing between a lock position shown in FIG. 7A and an unlock position shown in FIG. 8A due to a not-shown locking actuator. The swinging of the lock lever 68 is controlled by a signal (locking signal/ unlocking signal) from the vehicle ECU 80 (ETACS). That is, when the locking signal is outputted from the door control portion 802, the lock lever 68 is moved to the lock position shown in FIG. 7A by the locking actuator. When the unlocking signal is outputted from the door control portion 802, the lock lever 68 is moved to the unlock position shown in FIG. 8A by the locking actuator. That is, the lock lever 68 is a locking member which can be moved to a predetermined locking position (lock position) to lock the operation of the latch mechanism 60A serving as a retention mechanism. The lock lever 68 can move to the locking position (lock position) whether the door member is in the opened state or the closed state.

(Lock State Where Door Member in Fully Closed Position is Locked (Locked State))

When the door member is in a locked state, the latch mechanism 60A is in a state shown in FIG. 5A, and the link mechanism 60B is in a state shown in FIG. 7A.

That is, in the latch mechanism 60A, the fork 62 is located in the locked position, and the pawl lever 63 is located in the regulated position, so that the fully closed state of the door can be retained.

In the link mechanism 60B, the lock lever 68 is located in the lock position by the operation of the locking actuator. In addition, the open lever 65, the handle lever 66 and the control lever 67 are located in the standby positions.

In this state, as shown in FIG. 7A, the engagement pin 6804 is located in the lock area 6704B of the engagement groove 6704 of the control lever 67 due to the engagement groove 6802 of the lock lever 68 so that the engagement groove 6802 and the lock area 6704B extend substantially in one and the same direction. In addition, the engagement groove 6802 of the lock lever 68 and the engagement groove 6502 of the open lever 65 extend substantially in directions perpendicular to each other.

Accordingly, even when a door opening operation is performed on one of the operation portions 30 so that the handle lever 66 is made to swing by the door handle actuator, the control lever 67 swings through the engagement portion 6606 and the engagement pin 6702, but the engagement pin 6804 merely moves within the lock area 6704B relatively, as shown in FIG. 7B. Thus, the open lever 65 is retained in the standby position without making the open lever 64 of the latch mechanism 60A swing from the standby position to the operation position. As a result, the fully closed position of the door can be retained.

In addition, even when the door handle 32 is operated, the control lever 67 swings but the open lever 65 is retained in the standby position in the same manner as described above.

That is, when the lock lever 68 serving as a locking member moves to the lock position (locking position), the operation of the latch mechanism 60A serving as a retention mechanism can be locked.

(Unlock State Where Door in Fully Closed Position is Unlocked (Unlocked State))

Assume that the link mechanism 60B is in the locked state. When an unlocking signal is outputted from the door control portion 802 of the vehicle ECU 80 in this state, the locking actuator is operated so that the lock lever 68 swings from the lock position to the unlock position as shown in FIG. 8A.

When the lock lever 68 swings to the unlock position, the engagement pin 6804 is located in the unlock area 6704A of the engagement groove 6704 of the control lever 67 due to the engagement groove 6802 of the lock lever 68, and the engagement groove 6802 extends on the circumference of a circle centering the spindle 69 and in a tangential direction on a place including the engagement pin 6804. That is, the control lever 67 and the open lever 65 are allowed to swing through the engagement pin 6804, the unlock area 6704A of the engagement groove 6704, and the engagement groove 6502.

Figure 8B:
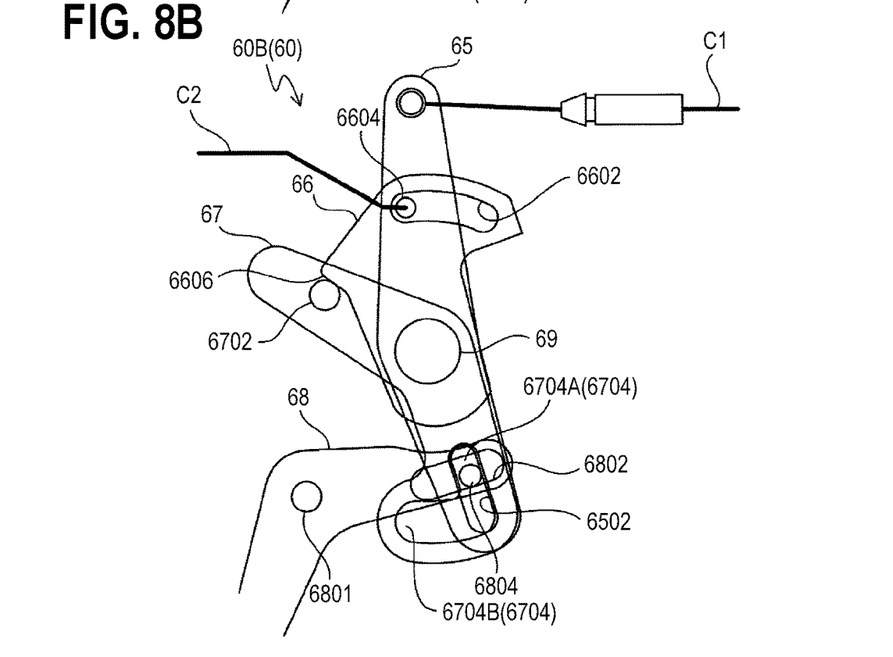

Accordingly, when the door opening/closing switch is pushed, as shown in FIGS. 8A and 8B, the handle lever 66 swings from the standby position through the cable C2 and the engagement pin 6604 due to the door handle actuator. Due to the swinging of the handle lever 66, the control lever 67 swings from the standby position through the engagement portion 6606 and the engagement pin 6702.

Due to the swinging of the control lever 67, the open lever 65 swings from the standby position through the engagement pin 6804, the engagement grooves 6704 (the unlock area 6704A) and 6502.

As shown in FIGS. 5A and 5B, the swinging of the open lever 65 is transmitted to the open lever 64 of the latch mechanism 60A through the cable C1 so as to make the open lever 64 swing and make the pawl lever 63 swing from the regulated position to the deregulated position through the one end 6402 of the open lever 64 and the engagement portion 6304 of the pawl lever 63.

As a result, the fork 62 reaches the opened position due to the not-shown spring, so that the door can be opened.

In addition, when the door handle 32 is operated, the open lever 65 swings through the handle lever 66 and the control lever 67 in the same manner as described above. Thus, the pawl lever 63 can be made to swing from the regulated position to the deregulated position through the cable C1 and the open lever 64.

Here, the door opening/closing actuator (opening/closing assisting mechanism 70) is operated by a signal from the door control portion 802. Thus, the door slides from the fully closed position to the opened position.

When the door is in the opened position, the door handle actuator for operating the cable C2 enters a non-operation state. In the latch mechanism 60A, as shown in FIG. 5C, the open lever 64 is located in the standby position by the not-shown spring, and the fork 62 is retained in the opened position by the not-shown spring.

In addition, when the open lever 64 of the latch mechanism 60A is located in the standby position, the open lever 65 in the link mechanism 60B is located in the standby position through the cable C1.

In addition, since the door handle 32 or the door handle actuator is in the non-operation state, the hand lever 66 is located in the standby position, and the control lever 67 is also located in the standby position through the engagement pin 6702.

(When Closing Instruction is Issued)

Assume that when one of the door members is located in the opened position, a door closing operation (closing instruction) for closing the door member is performed on one of the operation portions 30. In this case, the door opening/closing actuator (opening/closing assisting mechanism 70) is actuated by a signal from the door control portion 802 so that the door member slides from the opened position to the fully closed position.

In the latch mechanism 60A, as shown in FIGS. 5C and 5A, the striker 61 enters the engagement groove 6202 of the fork 62 which is located in the opened position in accordance with the movement of the door to the fully closed position. Thus, the fork 62 swings from the opened position to the locked position due to the striker 61.

The locked position of the fork 62 is retained by the pawl lever 63 and the open lever 64.

In the link mechanism 60B, as shown in FIG. 8A, the lock lever 68 is located in the unlock position. In this state, the door is in the fully closed position.

(When Closing and Locking Instruction is Issued)

Assume that when only one door member having an opening/closing assisting mechanism 70 has been opened, the selective instruction portion 300 is pushed twice to issue a closing and locking instruction. In this case, the door control portion 802 first uses the locking actuator to make the lock lever 68 (locking member) of the link mechanism 60B swing from the unlock position to the lock position.

As shown in FIG. 7A, due to the swinging of the lock lever 68 from the unlock position to the lock position, the engagement pin 6804 is moved to the lock area 6704B of the control lever 67.

Successively, the door opening/closing actuator is actuated by a signal from the door control portion 802 so that the door slides from the opened position to the fully closed position.

In the latch mechanism 60A, the striker 61 enters the engagement groove 6202 of the fork 62 which is located in the opened position in accordance with the movement of the door to the fully closed position. Thus, the fork 62 swings from the opened position to the locked position due to the striker 61.

The locked position of the fork 62 is retained by the pawl lever 63 and the open lever 64.

As shown in FIG. 7A, when the door is located in the fully closed position, the lock lever 68 is located in the lock position, and the engagement pin 6804 is located in the lock area 6704B of the control lever 67. Accordingly, even when the door opening/closing switch is pushed and the handle lever 66 is made to swing by the actuator, as shown in FIG. 7B, the control lever 67 swings through the engagement portion 6606 and the engagement pin 6702 but the engagement pin 6804 merely moves within the lock area 6704B relatively. Thus, the open lever 65 is retained in the standby position without making the open lever 64 of the latch mechanism 60A swing from the locked position to the opened position. As a result, the fully closed position of the door can be retained.

In addition, even when the door handle is operated, the control lever 67 swings but the open lever 65 is retained in the standby position in the same manner as described above.

In this manner, the lock lever 68 serving as a locking member can move to the lock position independently of the opened/closed state of the door member. When a closing instruction is issued, the door member can be closed after the lock lever 68 is moved to the lock position.

Incidentally, various configurations known in the background art can be used in the door lock portion 60. The door lock portion 60 is not limited to the aforementioned embodiment.

Figure 4:
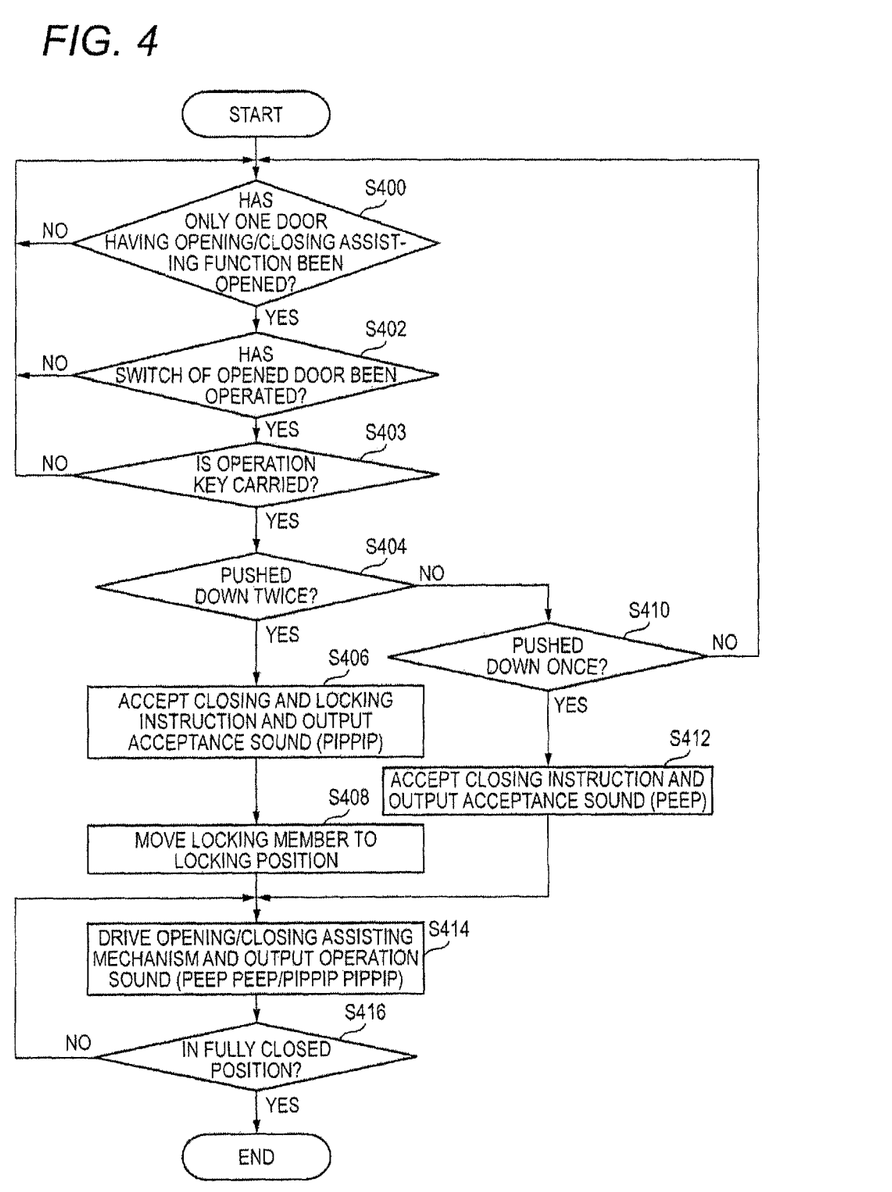
FIG. 4 is a flowchart showing processing of the vehicle door control device 10 in response to an operation on a selective instruction portion 300.

FIG. 4 is a flow chart showing the processing of the vehicle door control device 10 in response to an operation on the selective instruction portion 300.

Assume that, of the door members of the vehicle 20, only one of the door members (the rear seat door members 24 and the tail gate door member 26) each having an opening/closing assisting function is in the opened state (Yes in Step S400). In this case, the door control portion 802 determines whether the selective instruction portion 300 provided in the door member which is in the opened state has been operated or not (Step S402).

When the selective instruction portion 300 provided in the door member which is in the opened state has been operated (Yes in Step S402), the door control portion 802 determines whether a user who has operated the selective instruction portion 300 carries the keyless operation key 50 or not, that is, whether the keyless operation key 50 is within a detectable range or not (Step S403).

When the user who has operated the selective instruction portion 300 does not carry the keyless operation key 50 (No in Step S403), the door control portion 802 does not accept the operation but returns to Step S400 to repeat processing on and after Step S400. On this occasion, an error sound indicating that the operation cannot be accepted may be outputted by the sound output portion 804.

When the user who has operated the selective instruction portion 300 carries the keyless operation key 50 (Yes in Step S403), the door control portion 802 judges the number of operations on the selective instruction portion 300 (the number of times of pushing down the switch).

When the selective instruction portion 300 has been pushed down twice (Yes in Step S404), the door control portion 802 accepts the operation as a closing and locking instruction to close and lock the door members, and the sound output portion 804 outputs an acceptance sound of "pippip" from the speaker 76 (Step S406).

When the selective instruction portion 300 has been pushed down once (No in Step S404 and Yes in Step S410), the door control portion 802 accepts the operation as a closing instruction to close the door members, and the sound output portion 804 outputs an acceptance sound of "peep" from the speaker 76 (Step S412).

Then the door control portion 802 drives the opening/closing assisting mechanisms 70 of the door members which are in the opened state, so as to move the door members toward the fully closed positions. During the movement, the sound output portion 804 outputs an operation sound from the speaker 76 (Step S414). The operation sound for the closing and locking instruction is "pippip pippip", and the operation sound for the closing and locking instruction is "peep peep".

Until the door members reach the fully closed positions (Loop for No in Step S416), the door control portion 802 returns to Step S414 and continues to drive the opening/closing assisting mechanisms 70 and output the operation sound. As soon as the door members reach the fully closed positions (Yes in Step S416), the door control portion 802 terminates the processing of this flow chart.

When the following events 1) to 5) are detected during the driving of the opening/closing assisting mechanisms 70 in Step S416, the door control portion 802 suspends the driving of the opening/closing assisting mechanisms 70.

1) A case where it is detected that something has been caught in one of the doors; 2) a case where one of the door members does not move to the closed position perfectly (a case where one of the door members does not reach the fully closed position even when a predetermined time has passed since the start of driving the opening/closing assisting mechanisms 70; 3) a case where the user has carried out an operation for an opening instruction (for example, an operation performed again on the selective instruction portion 300 or an instruction on the keyless operation key 50); 4) a case where the user has opened one of the door members manually; and 5) a case where it is detected that the keyless operation key 50 is present inside the vehicle.

When the number of operations on the selective instruction portion 300 is not two or one in Step S410, the door control portion 802 regards the operation as wrong operation, cancels the operation, and returns to Step S400. On this occasion, an error sound indicating that the number of operations is wrong may be outputted by the sound output portion 804.

As has been described above, the vehicle door control device 10 according to the embodiment has the selective instruction portion 300 which can selectively issue the closing instruction to close the door members and the closing and locking instruction to close and lock the door members. Accordingly, the operation can be terminated in a shorter time than in a case where locking is accepted after all the door members are closed. In addition, since the number of operations is only one, the operability of the vehicle door can be improved advantageously.

In addition, since the selective instruction portion 300 is provided on the vehicle exterior side of each door member, a user who carries the keyless operation key 50 can issue the closing and locking instruction, for example, even when the hands of the user are full of baggage or the like. Thus, user friendliness can be improved.

In addition, the vehicle door control device 10 can selectively issue the closing instruction and the closing and locking instruction in accordance with a difference in operation method on a single switch. Accordingly, designability of the vehicle 20 can be improved and the vehicle cost can be reduced advantageously, as compared with a case where separate operation portions are provided for the two instructions.

In addition, the vehicle door control device 10 accepts an instruction on the assumption that the closing instruction (one-step processing of closing) is selected when the switch is pushed down once, and the closing and locking instruction (two-step processing of closing and locking) is selected when the switch is pushed down twice. Accordingly, the user can intuitively recognize the contents of the instruction corresponding to the operation. Thus, operability of the vehicle doors can be improved advantageously.

In addition, the vehicle door control device 10 outputs different operation sounds or acceptance sounds for a case where the closing instruction is issued and a case where the closing and locking instruction is issued. Accordingly, the user can advantageously confirm whether the operation carried out by the user himself/herself is an operation intended by the user himself/herself or not. Particularly, since the locking operation is performed inside each door member the user cannot see, the user cannot find any difference between the motion of the vehicle after the closing instruction and the motion of the vehicle after the closing and locking instruction. Therefore, when the sound corresponding to the indicated contents is outputted during the closing action, a sense of security can be given to the user.

In addition, the vehicle door control device 10 can lock the door members before closing the door members which have been opened. Accordingly, the other door members that have been fully closed can be locked quickly. Thus, the user friendliness can be improved. For example, when the closing action of the door members is stopped for some reason, the other door members are unlocked to be put into the unlocked state.

Although the embodiment has been described along an example in which the number of times of pushing down the switch is used as the difference in operation method for distinguishing the closing instruction and the closing and locking instruction from each other, the invention is not limited thereto. For example, those instructions may be distinguished by a difference in time for which the switch is pushed down, a difference in strength with which the switch is pushed down (for example, a difference in touch strength when the selective instruction portion 300 is a touch panel), or the like.

Although the embodiment has been described along an example in which a switch provided in a door member is used as the selective instruction portion 300, it is a matter of course that the closing instruction and the closing and locking instruction may be selectively issued using a switch (particularly the electric sliding door switch 58A or 58B, or the tail gate switch 56) of the keyless operation key 50.

What is claimed is:

1. A vehicle door control device which controls opening/closing of door members provided in entrances of a vehicle, the vehicle door control device comprising:
    a selective instruction portion that is provided on a vehicle exterior side of each of the door members and that is configured to selectively issue a closing instruction to close the door members and a closing and locking instruction to close and lock the door members, the selective instruction portion including a single switch that selectively issues the closing instruction and the closing and locking instruction by operating the single switch differently.

2. The vehicle door control device according to claim 1, wherein the selective instruction portion selectively issues the closing instruction and the closing and locking instruction by operating the single switch different number of times,
    in a case where the single switch is operated once, the closing instruction is selected; and
    in a case where the single switch is operated twice, the closing and locking instruction is selected.

3. The vehicle door control device according to claim 1 further comprising:
    a sound output portion that outputs first operation sounds during the closing of the door members when the closing instruction is issued and outputs second operation sounds different from the first operation sounds during the closing and locking of the door members when the closing and locking instruction is issued.

4. The vehicle door control device according to claim 3, wherein the sound output portion outputs first acceptance sounds in a case where the closing instruction is selected and outputs second acceptance sounds different from the first acceptance sounds in a case where the closing and locking instruction is selected.

5. The vehicle door control device according to claim 1 further comprising:
    a retention mechanism that holds the door members in a fully closed position with respect to a vehicle body; and
    a locking member that locks an operation of the retention mechanism by moving to a predetermined locking position,
    wherein the locking member is movable to the locking position independently to an opened/closed state of the door member, and
    in a case where the closing and locking instruction is issued, the door member is closed after the locking member is moved to the locking position.

6. The vehicle door control device according to claim 1, wherein at least one of the door members includes an opening/closing assisting mechanism which generates an assisting force for assisting the opening and closing of the door member; and
    the selective instruction portion is provided on a vehicle exterior side of the door member including the opening/closing assisting mechanism.

7. The vehicle door control device according to claim 1, wherein at least one of the door members is a slide door that moves in a longitudinal direction of the vehicle and between an opening state and a closing state.

8. The vehicle door control device according to claim 1, wherein at least one of the door members is a tail gate door.

9. A vehicle, comprising:
    a vehicle door control device that controls opening/closing of a door member provided in an entrance of a vehicle; and
    a selective instruction portion provided on a vehicle exterior side of the door member and configured to selectively issue a closing instruction to close the door member and a closing and locking instruction to close and lock the door member, the selective instruction portion including a single switch that selectively issues the closing instruction and the closing and locking instruction by operating the single switch differently.

* * * * *